United States Patent
Sumiuchi

(10) Patent No.: US 9,832,722 B2
(45) Date of Patent: *Nov. 28, 2017

(54) INFORMATION PROCESSING APPARATUS, CONTROL METHOD, AND PROGRAM

(71) Applicant: CANON KABUSHIKI KAISHA, Tokyo (JP)

(72) Inventor: Kazuyoshi Sumiuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,017

(22) Filed: Mar. 9, 2017

(65) Prior Publication Data

US 2017/0181078 A1   Jun. 22, 2017

Related U.S. Application Data

(63) Continuation of application No. 14/986,918, filed on Jan. 4, 2016.

(30) Foreign Application Priority Data

Jan. 7, 2015 (JP) .................................. 2015-001779

(51) Int. Cl.
*H04B 7/00* (2006.01)
*H04W 48/20* (2009.01)
*H04W 48/16* (2009.01)

(52) U.S. Cl.
CPC ........... *H04W 48/20* (2013.01); *H04W 48/16* (2013.01)

(58) Field of Classification Search
CPC ..... H04W 88/02; H04W 88/06; H04W 88/08; H04W 88/085; H04W 4/02; H04W 54/18; H04W 48/16; H04W 48/17; H04W 48/18; H04W 48/20; H04M 1/72527; H04M 1/725; H04M 1/7523; H04M 1/72522; H04M 2250/102
USPC .................. 455/434, 556.1, 557, 41.2, 422.1
See application file for complete search history.

*Primary Examiner* — Temica M Beamer
(74) *Attorney, Agent, or Firm* — Canon U.S.A., Inc. IP Division

(57) ABSTRACT

In an information processing apparatus, a transmission unit transmits information stored by a storage unit to a communication apparatus when an access point corresponding to the information stored by the storage unit is an access point to which the communication apparatus is connectable, and transmits to the communication apparatus information on an access point selected using a displayed list when an access point corresponding to the information stored by the storage unit is not an access point to which the communication apparatus is connectable. The information processing apparatus communicates with the communication apparatus via an access point corresponding to information transmitted by the transmission unit.

20 Claims, 8 Drawing Sheets

INFORMATION PROCESSING APPARATUS, CONTROL METHOD, AND PROGRAM

CROSS-REFERENCE TO RELATED APPLICATION

This application is a Continuation of U.S. application Ser. No. 14/986,918 filed Jan. 4, 2016, which claims the benefit of Japanese Patent Application No. 2015-001779, filed Jan. 7, 2015, which is hereby incorporated by reference herein in its entirety.

BACKGROUND

Field

Aspects of the present invention generally relate to an information processing apparatus, a control method, and a program.

Description of the Related Art

Examples of a method of connection of an information processing apparatus such as a personal computer or a smartphone to a communication apparatus such as a network-ready printer include a method of connection via an access point such as a wireless LAN router that is placed outside the information processing apparatus and is connected to the Internet. This connection method is called infrastructure connection. The information processing apparatus and the communication apparatus can communicate with each other after the establishment of the infrastructure connection between them, and can also be connected to the Internet to use service on the Internet.

On the other hand, there is a method of communication of an information processing apparatus with a communication apparatus without intervention of an access point placed outside the information processing apparatus. For example, in a case where a communication apparatus has a function of an access point, an information processing apparatus can communicate with the communication apparatus by being connected to the access point in the communication apparatus. This connection method is called direct connection. Even in an environment where no access point such as a wireless LAN router is placed outside an information processing apparatus or the information processing apparatus cannot use an access point, the information processing apparatus and the communication apparatus can communicate with each other by the direct connection between them.

Japanese Patent Laid-Open No. 2014-36292 discloses a printer capable of communicating with an information processing apparatus by both the infrastructure connection and the direct connection.

As disclosed in Japanese Patent Laid-Open No. 2014-36292, in a case where there are a plurality of methods of establishing the connection of a communication apparatus, a user sometimes sets one of these methods. However, it is difficult for a user to appropriately determine which of these methods should be set for a communication apparatus.

SUMMARY

According to aspects of present invention provides an information processing apparatus that appropriately sets, for a communication apparatus, a connection mode used to determine a form of connection between the information processing apparatus and the communication apparatus, a control method, and a program. An information processing apparatus according to an embodiment of the present invention communicates with a communication apparatus and includes a storage unit configured to store information on an access point connected to the information processing apparatus, an acquisition unit configured to acquire a list of access points to which the communication apparatus is connectable after the storage unit has stored information on an access point connected to the information processing apparatus, a display unit configured to display the list when an access point corresponding to information stored by the storage unit is not an access point to which the communication apparatus is connectable, and a transmission unit configured to transmit information stored by the storage unit to the communication apparatus when an access point corresponding to the information stored by the storage unit is an access point to which the communication apparatus is connectable, and transmit to the communication apparatus information on an access point selected using the displayed list when an access point corresponding to the information stored by the storage unit is not an access point to which the communication apparatus is connectable. The information processing apparatus communicates with the communication apparatus via an access point corresponding to information transmitted by the transmission unit.

Further features of the present disclosure will become apparent from the following description of exemplary embodiments with reference to the attached drawings.

DESCRIPTION OF THE EMBODIMENTS

Exemplary embodiments of the present invention will be described below by way of example with reference to the accompanying drawings. It should be noted that changes and modifications may be made to the following embodiments without departing from the scope of the aspects of the present invention based on the knowledge of those skilled in the art and these changes and modifications are also intended to be within the scope of the aspects of the present invention.

First Embodiment

An information processing apparatus according to this embodiment will be described with reference to FIGS. 1 to 6. An information processing apparatus is a smartphone in this embodiment, but may be, for example, a mobile terminal, a notebook PC, a tablet terminal, a Personal Digital Assistant (PDA), or a digital camera. A communication apparatus is a printer in this embodiment, but may be any apparatus capable of communicating with an information processing apparatus. Examples of a communication apparatus include various printers such as an ink-jet printer, a full-color laser beam printer, and a black-and-white printer, a copier, a facsimile apparatus, a mobile terminal, a smartphone, a notebook PC, a tablet terminal, a Personal Digital Assistant (PDA), a digital camera, and a multifunction device having a copy function, a facsimile function, and a print function.

Figure 2:
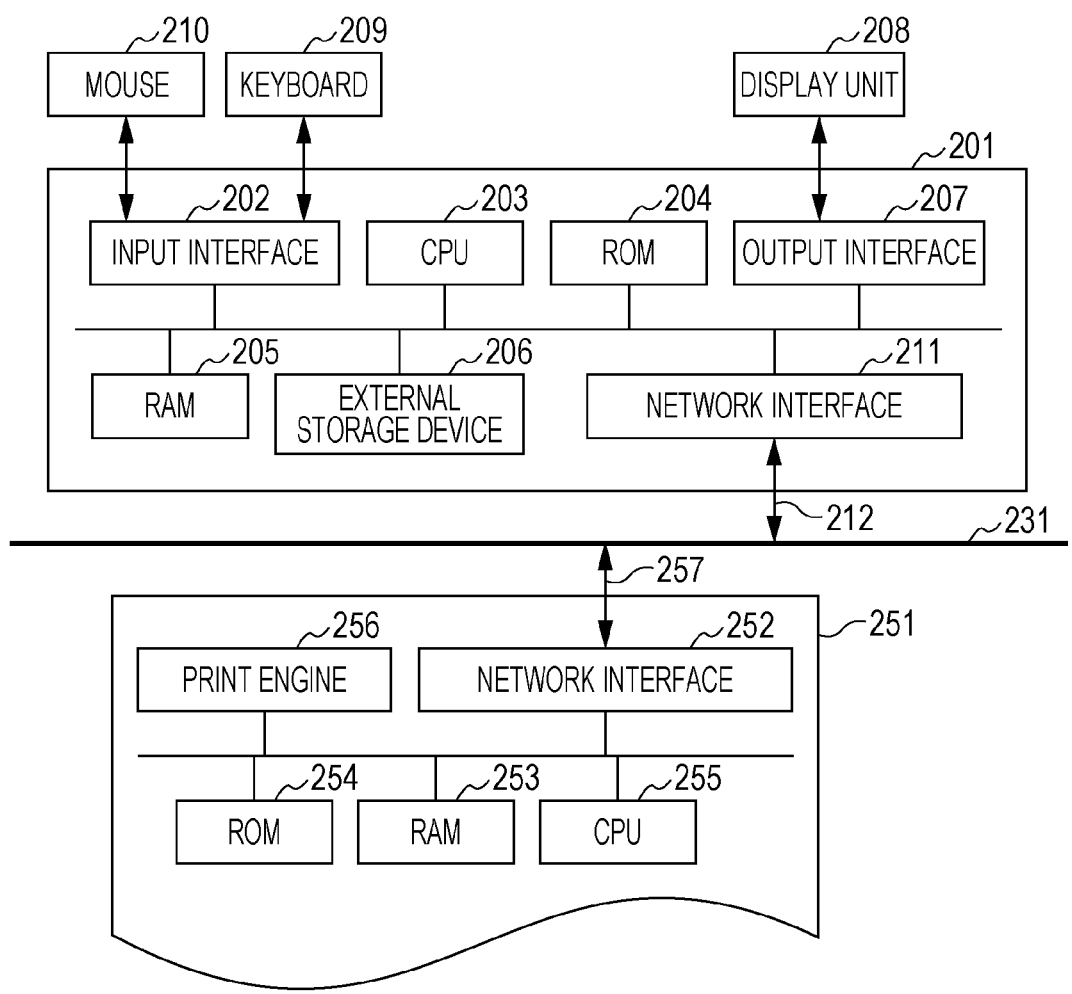
FIG. 2 is a diagram illustrating exemplary configurations of apparatuses according to an embodiment.
Figure 3:
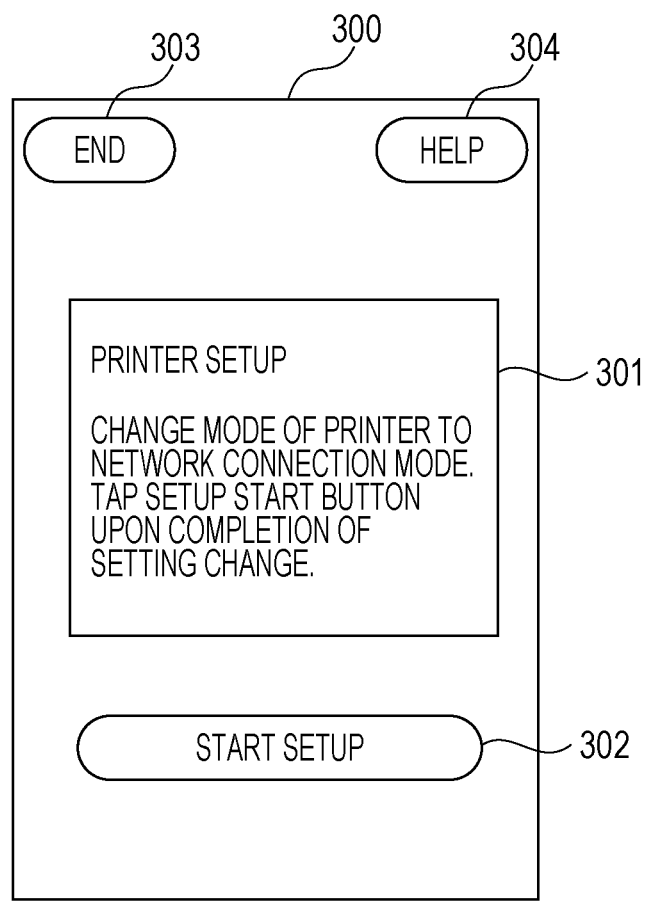
FIG. 3 is a diagram illustrating an example of a setting start screen in an application according to an embodiment.

First, the configurations of an information processing apparatus according to this embodiment and a communication apparatus capable of communicating with an information processing apparatus will be described with reference to a block diagram in FIG. 2. Although the following exemplary configuration of an information processing apparatus is employed in this embodiment, an information processing apparatus according to this embodiment does not necessarily have to have functions illustrated in the drawing as long as it can communicate with a communication apparatus.

An information processing apparatus 201 includes an input interface 202, a central processing unit (CPU) 203, a Read-Only Memory (ROM) 204, a Random Access Memory (RAM) 205, an external storage device 206, an output interface 207, a display unit 208, and a network interface 211.

The network interface 211 is connectable to an access point (not illustrated) in a communication apparatus 251. When the network interface 211 and an access point in the communication apparatus 251 are connected, the information processing apparatus 201 and the communication apparatus 251 can communicate with each other. The communication between them may be direct radio communication, or may be performed via an external access point on a wired network. Examples of a communication method include WirelessFidelity (Wi-Fi), Bluetooth®, and Near Field Communication; ISO/IECIS 18092 (NFC). In an embodiment of the present invention, an access point is a device having a function of interconnecting the information processing apparatus 201 and the communication apparatus 251 and a function of connecting to another network such as the Internet.

The ROM 204 stores an initialization program. The external storage device 206 stores an operating system (hereinafter referred to as an OS) (not illustrated). The OS includes a print service program used for print control. The external storage device 206 further stores an application that allows a user to execute printing, a print information generation program used for the generation of print information interpretable by the communication apparatus 251, various programs including an information exchange control program used for the exchange of information with the communication apparatus 251 via the network interface 211, an OS, and various pieces of information used by these programs. When the CPU 203 executes processing on the basis of various programs, the functions and process (to be described later) of the information processing apparatus 201 are realized. In the following, for the simplification of explanation, the embodiments of the present invention will be described as if the programs, instead of the CPU 203, perform the processing.

The communication apparatus 251 includes a network interface 252, a RAM 253, a ROM 254, a CPU 255, and a print engine 256. The network interface 252 has an access point connectable to the network interface 211 in the information processing apparatus 201.

The RAM 253 is used as a main memory and a work memory for the CPU 255, and stores various pieces of information and a receiving buffer for temporarily storing received print information. The print engine 256 performs printing on the basis of information stored in the RAM 253.

The ROM 254 stores various control programs and information used by the control programs. The CPU 255 controls each unit in the communication apparatus 251 in accordance with these control programs.

In this embodiment, the information processing apparatus 201 and the communication apparatus 251 perform respective pieces of processing as above, but this is merely an example. Which apparatus is in charge of each piece of processing may be determined in another manner.

The process of the information processing apparatus 201 is performed by causing the CPU 203 to load a control program for the process stored in the ROM 204 or an HDD (not illustrated) into the RAM 205 and execute the control program.

Figure 1A:
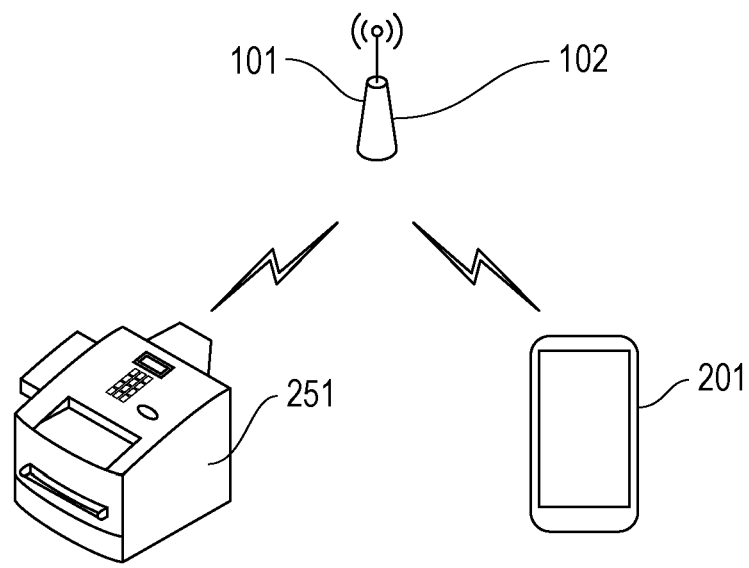
FIGS. 1A and 1B are conceptual diagrams describing the connection modes of a communication apparatus.
Figure 1B:
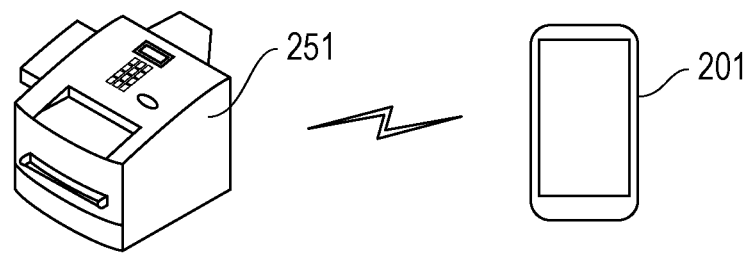

Exemplary connection modes of the communication apparatus 251 will be described with reference to FIGS. 1A and 1B. The connection mode is a mode used to determine a method of the connection between the information processing apparatus 201 and the communication apparatus 251, and is set for the communication apparatus 251. The connection method is how to establish the connection between the information processing apparatus 201 and the communication apparatus 251. In this embodiment, for example, the information processing apparatus 201 and the communication apparatus 251 perform the infrastructure connection to be described later and the direct connection to be described later.

First, an infrastructure connection mode will be described with reference to FIG. 1A. The infrastructure connection mode is a connection mode in which the information processing apparatus 201 and the communication apparatus 251 operate to be connectable to each other via a router 101 that is an access point outside the communication apparatus 251. In this embodiment, when the communication apparatus 251 is in this connection mode, communication between these apparatuses is performed via the router 101. At that time, since the router 101 is connectable to an Internet 102, the information processing apparatus 201 and the communication apparatus 251, which communicate with each other via the router 101, can also be connectable to the Internet 102. In embodiments of the present invention, an access point such as the router 101 that is placed outside the information processing apparatus 201 and the communication apparatus 251 and is connected to the Internet is called an external access point.

Next, a direct connection mode will be described with reference to FIG. 1B. The direct connection mode is a connection mode in which the information processing apparatus 201 and the communication apparatus 251 operate to be connectable to each other via an access point in the communication apparatus 251. In this embodiment, when the communication apparatus 251 is in this connection mode, the communication between these apparatuses is performed by the connection between the information processing apparatus 201 and an access point in the communication apparatus 251. In the direct connection mode, even in a case where there is no external access point that can connect the information processing apparatus 201 and the communication apparatus 251, the information processing apparatus 201 and the communication apparatus 251 can operate to be connectable to each other. However, in a case where the communication apparatus 251 does not have a function for a WAN which an external wireless LAN router has, the communication apparatus 251 may not be connected to the Internet.

According to this embodiment, an application for the information processing apparatus 201 can determine whether the information processing apparatus 201 is connected to an external access point such as the router 101 and select a suitable connection mode for the communication apparatus 251 on the basis of a result of the determination.

Next, a connection setting mode will be described. In this embodiment, in addition to the infrastructure connection mode and the direct connection mode which are connection modes set for the communication apparatus 251 at the time of normal communication, a connection setting mode can be set for the communication apparatus 251. The connection setting mode is a special connection mode set to connect the information processing apparatus 201 and the communication apparatus 251 and set one of the infrastructure connection mode and the direct connection mode for the communication apparatus 251. The communication apparatus 251 in the connection setting mode activates an access point having a service set identifier (SSID) generated in accordance with a predetermined rule (hereinafter referred to as a generation rule). An SSID is the identification name of an access point. The information processing apparatus 201 sets the SSID of an access point as a connection destination SSID representing the connection destination of the information processing apparatus 201, thereby being connected to the access point. The SSID of an access point in the communication apparatus 251 used in the connection setting mode is hereinafter referred to as a communication apparatus SSID. The communication apparatus SSID is an SSID that is valid only when the communication apparatus 251 is in the connection setting mode. The communication apparatus SSID is generated in accordance with a generation rule and is distinguished from the SSID of an external access point such as a wireless LAN router. In this embodiment, a user sets the connection setting mode for the communication apparatus 251.

In an embodiment of the present invention, a connection between apparatuses is established in a wireless or wired manner.

Next, a processing flow according to this embodiment will be described with reference to FIG. 4. In this embodiment, first, a user launches a predetermined application in the information processing apparatus 201. The predetermined application is an application used to set the connection mode of the communication apparatus 251. In addition to the function of setting a connection mode for the communication apparatus 251, this application may have other functions such as a function of selecting print information to be transmitted to the communication apparatus 251 and a function of performing other setting operations for the communication apparatus 251. The application displays a setting start screen illustrated in FIG. 3 on the information processing apparatus 201 to instruct a user to set the connection setting mode for the communication apparatus 251. The instruction to a user may be issued by the communication apparatus 251. That is, for example, when the communication apparatus 251 is started for the first time, the communication apparatus 251 may issue an instruction to a user using a display unit thereof. A user changes the mode of the communication apparatus 251 to the connection setting mode in accordance with the instruction. At that time, as described previously, a communication apparatus SSID is generated for the communication apparatus 251 for which the connection setting mode has been set. The communication apparatus SSID may be generated when the connection setting mode is validated as described previously, or the communication apparatus SSID that has been generated and stored in a memory in advance may be read when the connection setting mode is validated. When an end button 303 is tapped, the application ends processing. When a HELP button 304 is tapped, the application displays a screen on which user support information such as an application operation method is displayed. At that time, the communication apparatus 251 may be set to the connection setting mode without a user's operation. For example, setting may be performed so that the communication apparatus 251 is in the connection setting mode in a specified period from a time at which the communication apparatus 251 is started for the first time. In this case, at the time of setup of the communication apparatus 251, a connection mode setting operation can be omitted and the convenience of a user is enhanced.

Subsequently, when a user taps a setup start button 302, the application performs a process illustrated in FIG. 4.

In step S401, the application determines whether the information processing apparatus 201 is connectable to an external access point. For example, this check is performed by determining whether the network setting (for example, Wi-Fi) of the information processing apparatus 201 is valid. On the basis of a result of the determination, the process proceeds to the next step. At that time, when it is determined that the network setting of the information processing apparatus 201 is valid and there are access points within a range in which the information processing apparatus 201 is communicable, the information processing apparatus 201 is connected to one of these access points. The SSID of the access point connected to the information processing apparatus 201 is set as the connection destination SSID. On the other hand, when a user does not use an external access point such as the router 101, that is, when no access point connectable to the information processing apparatus 201 is found, the connection destination SSID is not set. That is, when the network setting of the information processing apparatus 201 is valid and the connection destination SSID of the information processing apparatus 201 is not set, a user does not have or use an external access point or a communication apparatus having an access point.

In step S402, the application changes the setting of the information processing apparatus 201 to make the information processing apparatus 201 connectable to an external access point. For example, this setting is performed by making the network setting of the information processing apparatus 201 valid. When the network setting is made to be valid in step S402, the information processing apparatus 201 is connected to an access point around the information processing apparatus 201. When there is an access point to which the information processing apparatus 201 is connectable in a range in which the information processing apparatus 201 is connectable, the information processing apparatus 201 is connected to the access point. At that time, the SSID of the access point is set as the connection destination SSID. On the other hand, when the user does not use the router 101 or an access point in the communication apparatus 251, that is, no access point is found around the information processing apparatus 201, the connection destination SSID is not set. That is, when the network setting of the information processing apparatus 201 is valid and the connection destination SSID of the information processing apparatus 201 is not set, the user does not have or use an external access point or a communication apparatus having an access point. When there is a plurality of connectable access points, one of these access points is selected as an access point to be connected to the information processing apparatus 201 in accordance with the setting and specification of the information processing apparatus 201. At that time, a list of connectable access points may be displayed to allow a user to select one of these access points.

In step S403, the application acquires a list of SSIDs of connectable access points around the information processing apparatus 201 from a system such as an OS operating in the information processing apparatus 201. Subsequently, the process proceeds to step S404.

In step S404, the application determines whether there is a communication apparatus SSID in the acquired SSID list. As described previously, the communication apparatus SSID is generated in accordance with a generation rule. Accordingly, this determination is performed by determining whether there is an SSID compliant with the generation rule in the SSID list acquired by the application. For example, in a case where the generation rule of the communication apparatus SSID is the inclusion of a predetermined character string, the application determines whether there is an SSID including the predetermined character string in the SSID list in step S404. Subsequently, on the basis of a result of the determination, the process proceeds to the next step. When there is no communication apparatus SSID in the list, the application determines that the user has not set the connection setting mode for the communication apparatus 251 in response to the instruction of the application and ends the process. At that time, for example, the application may display a screen prompting the user to set the connection setting mode for the communication apparatus 251. On the other hand, when there is the communication apparatus SSID in the list, the process proceeds to step S405.

In step S405, the application acquires the name of the SSID set as the connection destination SSID of the information processing apparatus 201. At that time, when the connection destination SSID is not set, the application cannot acquire the name of the connection destination SSID. Subsequently, the process proceeds to step S406.

In step S406, the application determines whether the name of the connection destination SSID has been acquired in step S405. When it is determined that the application has acquired the name of the connection destination SSID, the process proceeds to step S408. When it is determined that the application has not acquired the name of the connection destination SSID, the process proceeds to step S407.

In step S407, the application sets the communication apparatus SSID included in the list acquired in step S404 as a connection destination SSID, so that the information processing apparatus 201 is connected to the communication apparatus 251 without intervention of an external access point. When the list includes a plurality of SSIDs compliant with the generation rule of the communication apparatus SSID, the application may display the list of these SSIDs to allow a user to select an SSID to be set as the connection destination SSID. Subsequently, the application performs processing for setting the direct connection mode for the communication apparatus 251. This processing is performed by transmitting an instruction for setting the direct connection mode to the communication apparatus 251. Subsequently, the application ends the process. In this embodiment, upon receiving an instruction for setting the direct connection mode from the application, the communication apparatus 251 transmits a direct connection SSID to the information processing apparatus 201 and changes the connection mode thereof from the communication setting mode to the direct connection mode. The direct connection SSID is the SSID of an access point different from the access point having the communication apparatus SSID in the communication apparatus 251 and is used for the direct connection to the information processing apparatus 201. At that time, the communication apparatus 251 makes the access point having the communication apparatus SSID invalid by canceling the communication setting mode. After that, the communication apparatus 251 operates to be capable of performing the direct connection to the information processing apparatus 201 by making an access point having the direct connection SSID valid. Furthermore, at that time, the information processing apparatus 201 performs the direct connection to the communication apparatus 251 by setting the direct connection SSID as the connection destination SSID. With this configuration, the information processing apparatus 201 can perform the direct connection to the communication apparatus 251 after setting the direct connection mode for the communication apparatus 251.

In step S408, the application determines whether the access point connected to the information processing apparatus 201 is connected to the Internet. The processing of step S408 is performed in consideration of a case where the information processing apparatus 201 is connected to an access point in an apparatus (for example, the communication apparatus 251) other than an external access point such as the router 101 connected to the Internet. For example, this determination is performed by determining whether an access point connected to the above-described information processing apparatus is an access point in the communication apparatus 251. At that time, for example, the application determines whether the connection destination SSID includes a character string representing the generation rule of the communication apparatus SSID. As a result, in step S408, it can be determined whether the access point connected to the information processing apparatus 201 is an access point connected to the Internet. It may be determined whether the access point connected to the information processing apparatus 201 is an access point in an apparatus in a predetermined apparatus category (for example, a printer category or a facsimile category) or an access point in an apparatus manufactured by a predetermined manufacturer. When it is determined in step S408 that the connection destination SSID is compliant with the generation rule, the process proceeds to step S409. When it is determined in step S408 that the connection destination SSID is not compliant with the generation rule, the process proceeds to step S410. At that time, it may be determined whether the connection destination SSID is not compliant with the generation rule.

In step S410, the application terminates the connection to the access point. Subsequently, since the network setting of the information processing apparatus 201 has already been valid and the information processing apparatus 201 is connectable to an access point, the application connects the information processing apparatus 201 to an access point other than the disconnected access point. Subsequently, the process returns to step S405. The effect of the processing of step S410 will be described in detail. For example, it is assumed that, despite the presence of an external access point connected to the Internet, the information processing apparatus 201 is connected to an access point in the communication apparatus 251. At that time, since the connection to the access point in the communication apparatus 251 is terminated in step S410, the information processing apparatus 201 can be connected to the external access point connected to the Internet. Thus, an external access point suitable for the infrastructure connection mode can be preferentially connected to the information processing apparatus 201.

In step S409, the application stores the name of the SSID of the external access point connected thereto.

In step S411, the application sets the communication apparatus SSID in the list acquired in step S404 as the connection destination SSID to change the connection destination of the information processing apparatus 201 to the communication apparatus 251. At that time, the information processing apparatus 201 is connected to the communication apparatus 251 without intervention of an external access point. Subsequently, the application sets the infrastructure connection mode for the communication apparatus 251. For example, the application performs this processing by transmitting an instruction for setting the infrastructure connection mode and the SSID stored in step S409 to the communication apparatus 251. When the communication apparatus 251 receives them, the communication apparatus 251 is set to the infrastructure connection mode in which the external access point having the SSID received from the information processing apparatus 201 is used. At that time, the communication apparatus 251 may be unable to connect to the access point having the SSID stored by the information processing apparatus 201 because the connectable regions of the information processing apparatus 201 and the communication apparatus 251 differ from each other. In this case, the application may allow a user to manually select an external access point to be used in the infrastructure connection mode. At that time, for example, the application acquires information about the SSID of an external access point to which the communication apparatus 251 is connectable. Subsequently, the application displays a list illustrated in FIG. 5 using the information about the SSID of an external access point to allow a user to select an external access point to be used in the infrastructure connection mode. After that, the application transmits the SSID of the selected external access point to the communication apparatus 251. At that time, when a password is needed for the use of access point, the application may display a password input screen illustrated in FIG. 6 and transmit input password information to the communication apparatus 251. When the communication apparatus 251 performs the infrastructure connection, the communication apparatus 251 uses the password information to connect to the access point. Subsequently, the application ends the process. In this embodiment, upon receiving an instruction for setting the infrastructure connection mode from the application, the communication apparatus 251 changes its connection mode from the communication setting mode to the infrastructure connection mode. At that time, the communication apparatus 251 makes the access point having the communication apparatus SSID invalid by canceling the communication setting mode. After that, the communication apparatus 251 can perform the infrastructure connection to the information processing apparatus 201 by connecting to the external access point using the SSID received from the information processing apparatus 201. At that time, the information processing apparatus 201 is disconnected from the communication apparatus 251 when the access point having the communication apparatus SSID is made to be invalid, but is then connected to the access point having the SSID stored in step S409. Thus, after setting the infrastructure connection mode for the communication apparatus 251, the information processing apparatus 201 can automatically perform the infrastructure connection to the communication apparatus 251. At that time, the communication apparatus 251 may perform the direct connection to another information processing apparatus by making an access point having a direct connection SSID valid.

In this embodiment, as a method of the connection of the information processing apparatus 201 to the communication apparatus 251 without intervention of an external access point, an exemplary case where the information processing apparatus 201 is connected to an access point in the communication apparatus 251 has been described. However, another method may be employed. For example, the information processing apparatus 201 may be wirelessly connected the communication apparatus 251 using a WLAN in the ad hoc mode without intervention of an access point in the communication apparatus 251.

With the above-described configuration, the application can select a connection mode from between the infrastructure connection mode and the direct connection mode in accordance with the conditions of the connection between the information processing apparatus 201 and an access point. Accordingly, in this embodiment, a user does not have to select the connection mode of the communication apparatus 251. Thus, the convenience of the user is enhanced.

For example, when an information processing apparatus is connected to a wireless LAN router, it is presumed that a user uses the wireless LAN router that is an external access point. When a wireless LAN router is used, a communication apparatus is connectable to the information processing apparatus via the wireless LAN router. Furthermore, at that time, the communication apparatus and the information processing apparatus are connectable to the Internet via the wireless LAN router. The connection to the Internet allows the communication apparatus to use a Web service function. The Web service is service via the Internet and examples of the Web service include the provision of a manual on the Internet, the guide of purchase of ink at the time of the shortage of ink, the version upgrade to the latest firmware on the Internet, cloud print service, and E-mail print service. Therefore, when a user uses a wireless LAN router, it is desired that the infrastructure connection mode be set for a communication apparatus. In this embodiment, when an information processing apparatus is connected to a wireless LAN router, the infrastructure connection mode is automatically set for a communication apparatus. Thus, the convenience of a user is enhanced.

For example, in an environment where a user can use a wireless LAN router, the user connects an information processing apparatus to the wireless LAN router for the high-speed communication with the Internet. However, when the information processing apparatus is connected to a communication apparatus for direct communication, the information processing apparatus is disconnected from the wireless LAN router and is connected to the Internet via a line compatible with 3G or LTE which has a relatively low communication speed. In a case where the 3G or LTE connection to the Internet is charged on a pay-as-you-go basis, this becomes a major problem. According to this embodiment, in a state where an information processing apparatus is connected to a wireless LAN router, the connection mode of a communication apparatus can be automatically set not to the direct connection mode but to the infrastructure connection mode. It is therefore possible to prevent the information processing apparatus from being connected to the Internet using a line compatible with 3G or LTE despite user's intentions.

On the other hand, for example, in a state where an information processing apparatus is not connected to a wireless LAN router, it is presumed that a user does not use the wireless LAN router. In this case, it is desired that the connection mode of a communication apparatus be set to the direct connection mode that enables the communication between apparatuses even in an environment where an external access point such as a wireless LAN router is not used. In this embodiment, in a state where an information processing apparatus is not connected to a wireless LAN router, the direct connection mode is automatically set for a communication apparatus. Thus, the convenience of a user can be enhanced.

According to this embodiment, an information processing apparatus sets the connection mode of a communication apparatus. Accordingly, even when a communication apparatus does not include a connection mode setting unit (for example, a display unit such as a liquid crystal panel), an information processing apparatus according to this embodiment can set the connection mode of the communication apparatus. Furthermore, according to this embodiment, an information processing apparatus sets the connection mode of a communication apparatus in accordance not with the connection condition of the communication apparatus but with the connection condition of the information processing apparatus. Accordingly, even in a case where a communication apparatus is not connected to an external access point despite the presence of the external access point when the communication apparatus is started at the first time, the connection mode of the communication apparatus can be appropriately selected in accordance with the network use environment of a user. A user uses an information processing apparatus rather than a communication apparatus on a day-to-day basis. Accordingly, by setting the connection mode of a communication apparatus in accordance with the connection condition of an information processing apparatus used by a user on a day-to-day basis, a connection mode suitable for a daily usage pattern can be set for the communication apparatus. Furthermore, an external access point connected to an information processing apparatus is probably used by a user on a day-to-day basis. Accordingly, it is possible to set the external access point convenient for the user as an external access point used for infrastructure connection.

Second Embodiment

In the first embodiment, an exemplary case where, in the setting of a connection mode, an application automatically selects one of the infrastructure connection mode and the direct connection mode in accordance with the conditions of the connection between the information processing apparatus 201 and an access point has been described. In this embodiment, an exemplary case where, at the time of the selection of a connection mode for the communication apparatus 251, a user can select a connection mode setting method from among the connection mode setting method described in the first embodiment, a method of setting the infrastructure connection mode, and a method of setting the direct connection mode will be described.

Figure 7:
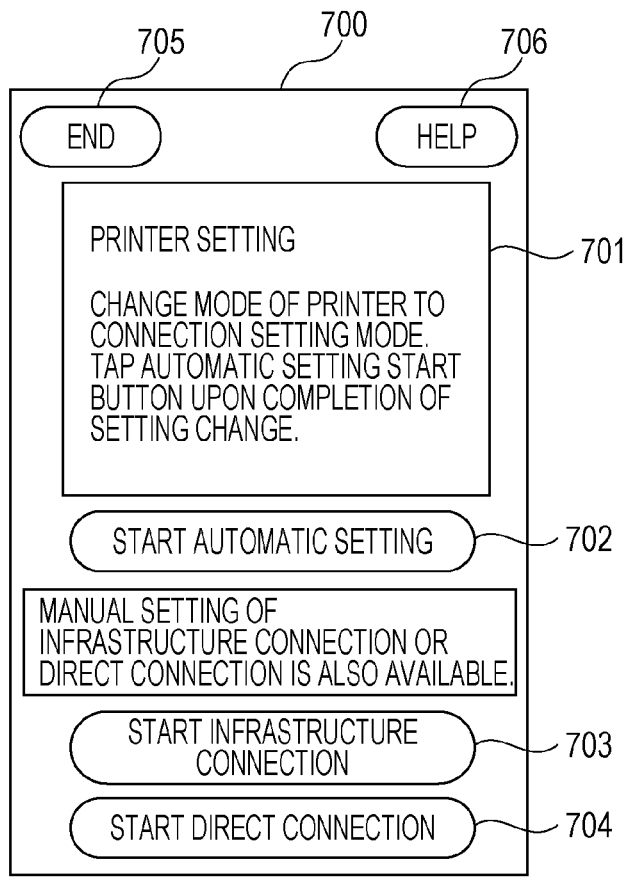
FIG. 7 is a diagram illustrating an example of a connection mode setting input screen according to a second embodiment.
Figure 8:
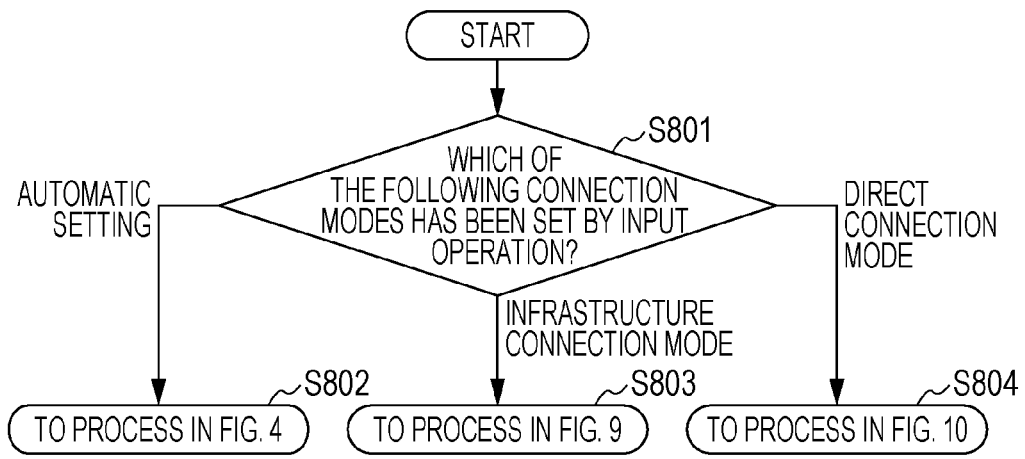
FIG. 8 is a flowchart of a process performed by an information processing apparatus according to the second embodiment.

A processing flow according to this embodiment will be described with reference to FIG. 4 and FIGS. 8 to 10. Like in the first embodiment, in this embodiment, first, a user starts a predetermined application in the information processing apparatus 201. In this embodiment, the application displays a setting start screen illustrated in FIG. 7 on the information processing apparatus 201 to instruct a user to set the connection setting mode for the communication apparatus 251. A user changes the mode of the communication apparatus 251 to the connection setting mode in accordance with the instruction. At that time, as described previously, for the communication apparatus 251 in the connection setting mode, a communication apparatus SSID is generated. The communication apparatus SSID may be generated when the connection setting mode is validated as described previously, or the communication apparatus SSID that has been generated and stored in a memory in advance may be read when the connection setting mode is validated. After changing the mode of the communication apparatus 251 to the connection setting mode, the user performs an input operation for the setting of a connection mode upon the application. For example, the input operation for the setting of a connection mode is performed via the screen illustrated in FIG. 7. In this embodiment, an automatic setting start button 702 is an instruction unit for causing the application to automatically select a connection mode for the communication apparatus 251. An infrastructure connection start button 703 is an instruction unit for setting the infrastructure connection mode for the communication apparatus 251. A direct connection start button 704 is an instruction unit for setting the direct connection mode for the communication apparatus 251. By tapping one of these instruction units, the input operation for the setting of a connection mode is performed. Subsequently, the application performs a process illustrated in FIG. 8. An end button 705 is a button used to end the application. A HELP button 706 is a button used to display a screen on which user support information such as an application operation method is displayed.

In step S801, the application determines which of connection modes has been set by the user's input operation. At that time, in this embodiment, a user taps the automatic setting start button 702 to cause the application to automatically select a connection mode for the communication apparatus 251. When the application detects the input operation performed with the automatic setting start button 702, the process proceeds to step S802. When the infrastructure connection mode is set for the communication apparatus 251, the user taps the infrastructure connection start button 703. When the application detects the input operation performed with the infrastructure connection start button 703, the process proceeds to step S803. When the direct connection mode is set for the communication apparatus 251, the user taps the direct connection start button 704. When the application detects the input operation performed with the direct connection start button 704, the process proceeds to step S804.

Figure 4:
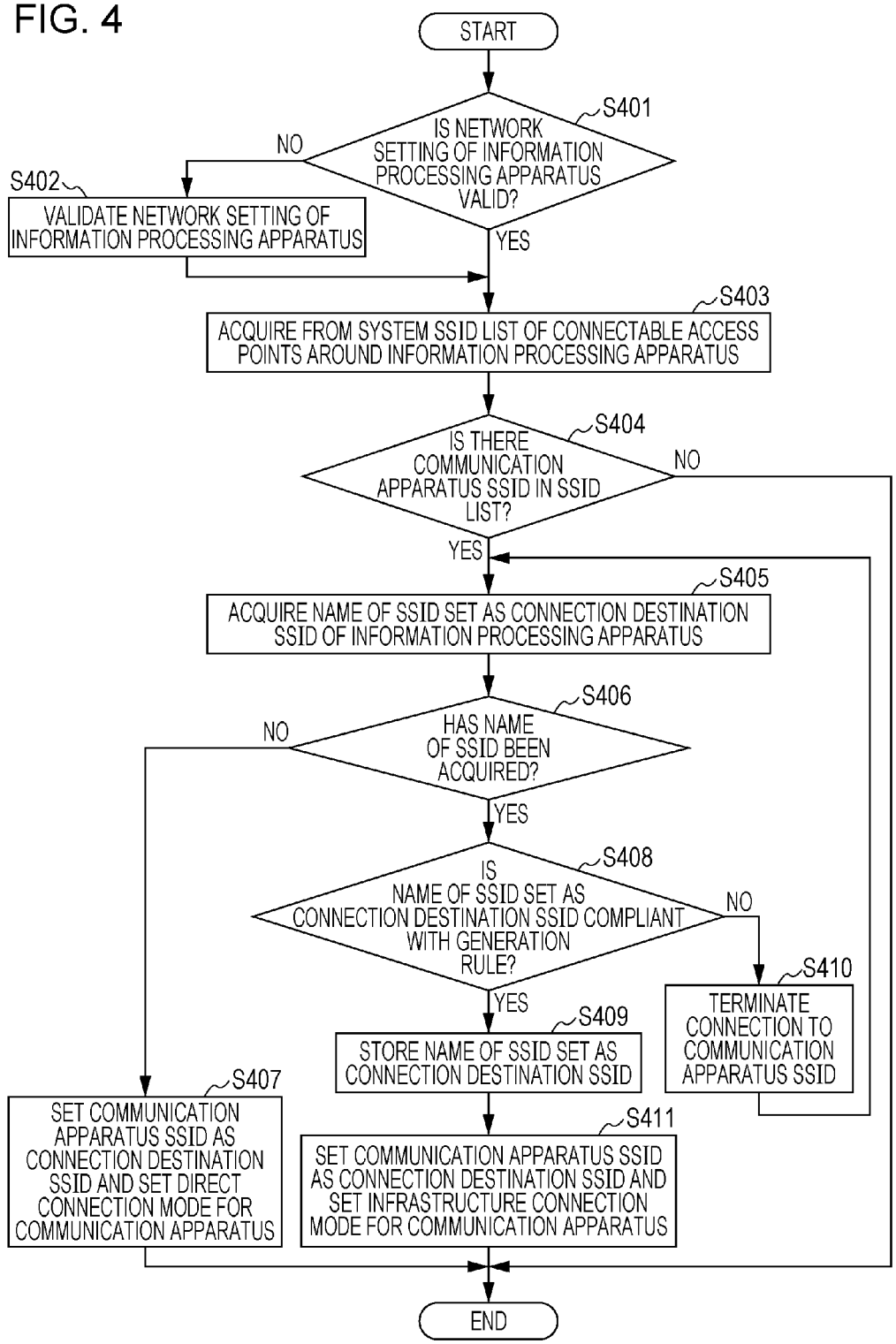
FIG. 4 is a flowchart of a process performed by an information processing apparatus according to a first embodiment.
Figure 5:
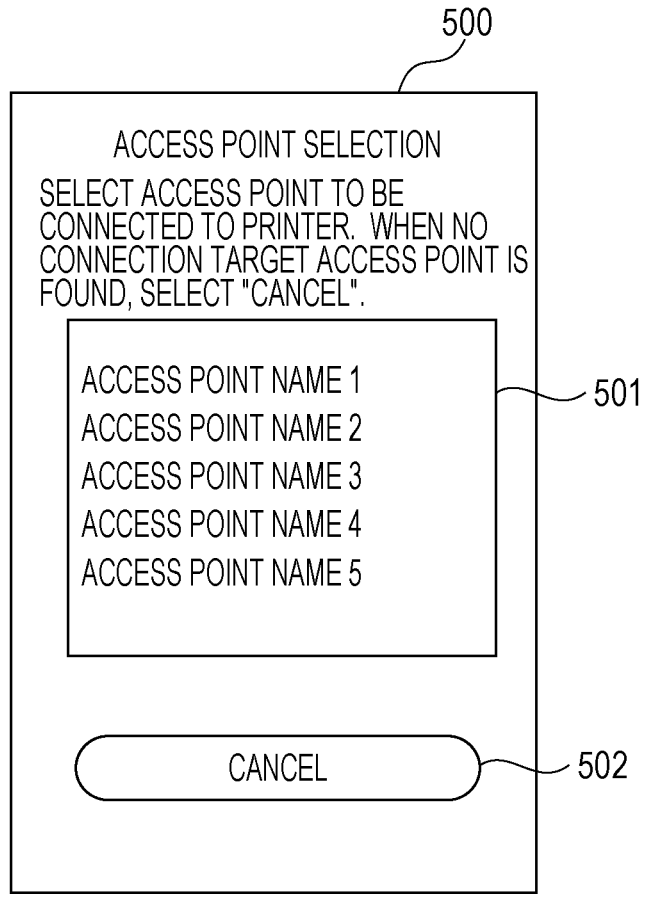
FIG. 5 is a diagram illustrating an example of an access point selection screen according to an embodiment.
Figure 6:
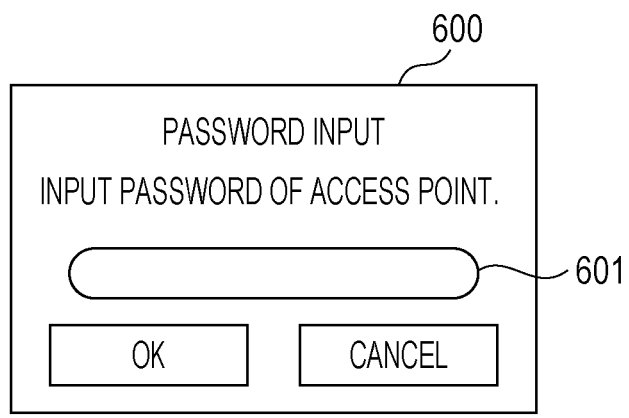
FIG. 6 is a diagram illustrating an example of a password input screen in an application according to an embodiment.

In step S802, the application starts the process illustrated in FIG. 4 to automatically select and set the connection mode of the communication apparatus 251. The process illustrated in FIG. 4 has already been described in the first embodiment, and the description thereof will be therefore omitted.

Figure 9:
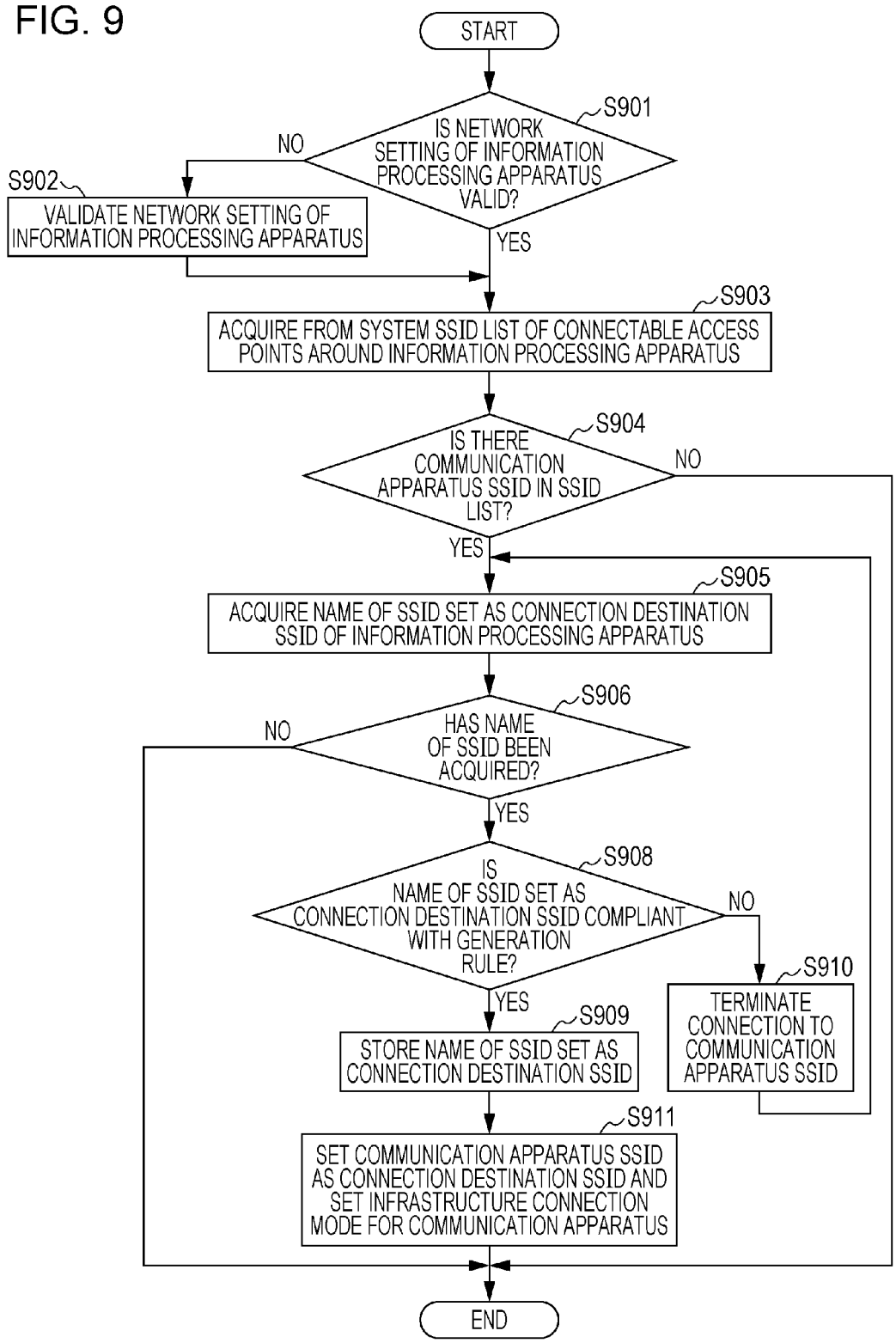
FIG. 9 is a flowchart of a process performed by an information processing apparatus according to the second embodiment.

In step S803, a process illustrated in FIG. 9 is started to set the infrastructure connection mode for the communication apparatus 251. The process from step S901 to step S905 and the process from step S908 to step S911 are the same as the process from step S401 to step S405 and the process from step S408 to step S411 in FIG. 4, respectively, and the description thereof will be therefore omitted.

In step S906, the application determines whether the name of the connection destination SSID has been acquired in step S905. When it is determined that the application has acquired the name of the connection destination SSID, the process proceeds to step S908. When it is determined that the application has not acquired the name of the connection destination SSID, the application terminates the process because the communication apparatus 251 is in a state unsuitable for the infrastructure connection mode despite the fact that the user has set the infrastructure connection mode. At that time, for example, the application may display a screen prompting the user to turn on an external access point used in the infrastructure connection mode or a screen prompting the user to set the direct connection mode.

Figure 10:
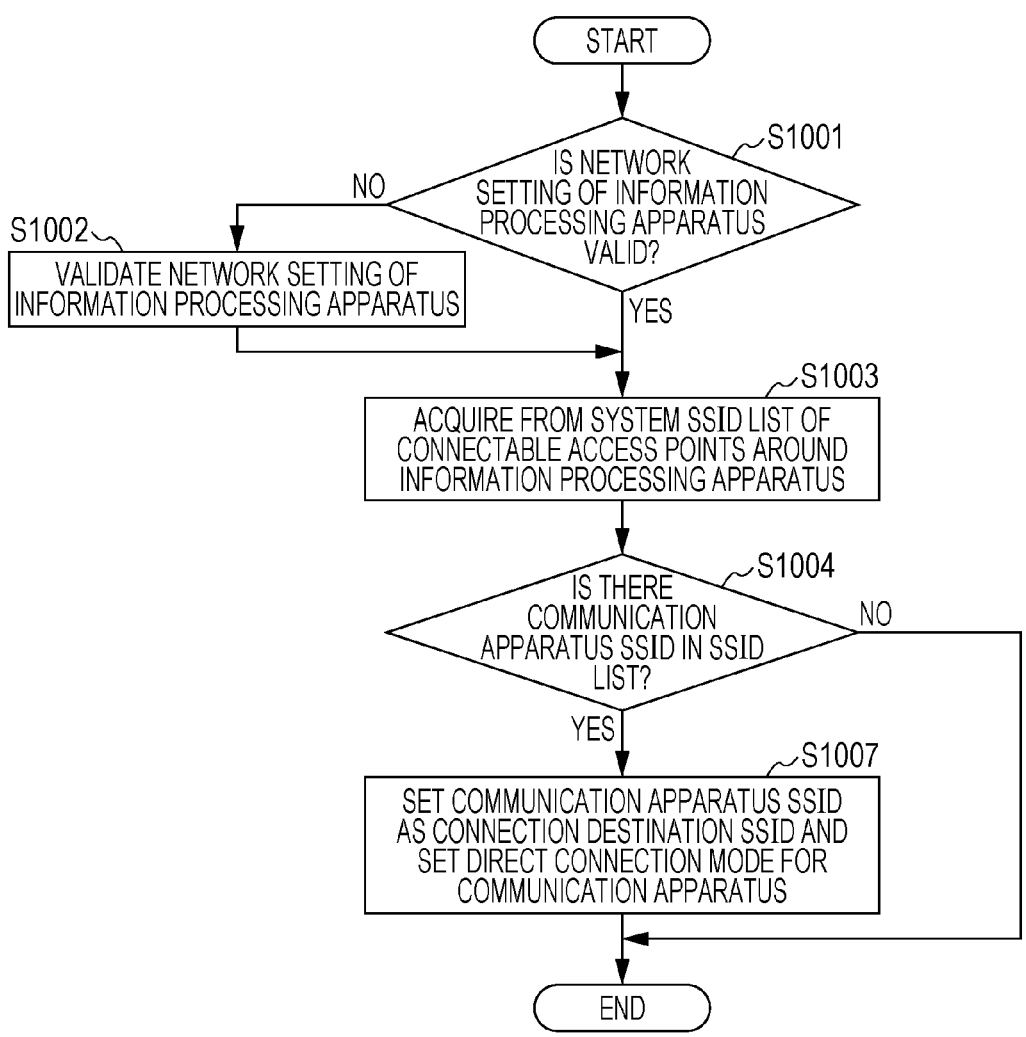
FIG. 10 is a flowchart of a process performed by an information processing apparatus according to the second embodiment.

In step S804, a process illustrated in FIG. 10 is started to set the direct connection mode for the communication apparatus 251. The process from step S1001 to step S1003 and the processing of step S1007 are the same as the process from step S401 to step S403 and the processing of step S407 in FIG. 4, respectively, and the description thereof will be therefore omitted.

In step S1004, the application determines whether there is a communication apparatus SSID in the acquired SSID list. As described previously, since a communication apparatus SSID is generated in accordance with a generation rule, this determination is performed by determining whether there is an SSID compliant with the generation rule of the communication apparatus SSID in the SSID list acquired by the application. When there is no communication apparatus SSID in the list, the application determines that the user has not set the connection setting mode for the communication apparatus 251 in response to the instruction of the application and ends the process. At that time, for example, the application may display a screen prompting the user to set the connection setting mode for the communication apparatus 251. On the other hand, when there is the communication apparatus SSID in the list, the process proceeds to step S1007 in which the application sets the direct connection mode for the communication apparatus 251.

With the above-described configuration, at the time of the setting of a connection mode, a user can optionally select a connection mode setting method from between the application's automatic selection of one of the infrastructure connection mode and the direct connection mode and the user's selection of one of them. Accordingly, in this embodiment, a user does not have to select a connection mode for the communication apparatus 251. Thus, the convenience of the user is enhanced.

This embodiment is effective in a case where a user wants to set the direct connection mode for the communication apparatus 251 even in an environment where the user can use an external access point. Furthermore, this embodiment is effective in a case where a user knows the difference between the infrastructure connection mode and the direct connection mode and wants to optionally change the connection mode of the communication apparatus 251.

Other Embodiments

In the above-described embodiments, an information processing apparatus for setting the infrastructure connection mode or the direct connection mode for a communication apparatus has been described. However, in embodiments of the present invention, a connection mode set for a communication apparatus is not limited to one of these modes, and any types of connection modes in which apparatuses operate to be connectable to each other can be employed. For example, a first connection mode in which a single information processing apparatus and a communication apparatus operate to be connectable to each other using Wi-Fi Direct (registered trademark) or a second connection mode in which a plurality of information processing apparatuses and a communication apparatus operate to be connectable to each other may be set for a communication apparatus.

In the aspects of the present invention, as long as the effect of each embodiment can be achieved, the order of pieces of processing in the flowchart in each embodiment may be changed, all pieces of processing do not necessarily have to be performed, or details of pieces of processing may be changed.

According to an embodiment of the present invention, a connection mode used to determine a method of the connection between an information processing apparatus and a communication apparatus in accordance with the conditions of the connection between the information processing apparatus and an access point is set for the communication apparatus. Therefore, the information processing apparatus according to an embodiment of the present invention can set a suitable connection mode for the communication apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-001779, filed Jan. 7, 2015, which is hereby incorporated by reference herein in its entirety.

What is claimed is:

1. An information processing apparatus that is connectable to an access point and communicates with a communication apparatus via the access point, the information processing apparatus comprising:
   a receiving unit configured to receive from a user an instruction for performing a setting relating to connection of the communication apparatus;
   a display unit configured to display a list of access points connectable by the communication apparatus, in a case where an access point to which the information processing apparatus is connected when the instruction is received is not an access point connectable by the communication apparatus, and not to display the list, in a case where an access point to which the information processing apparatus is connected when the instruction is received is an access point connectable by the communication apparatus; and an execution unit configured to execute a process for establishing connection between an access point selected from the list and the communication apparatus, in a case where the access point to which the information processing apparatus is connected when the instruction is received is not an access point connectable by the communication apparatus, and to execute a process for establishing connection between the access point to which the information processing apparatus is connected and the communication apparatus, in a case where the access point to which the information processing apparatus is connected when the instruction is received is an access point connectable by the communication apparatus.

2. The information processing apparatus according to claim 1, further comprising
an input receiving unit configured to receive an input of connection information on the access point selected from the list,
wherein the process for establishing connection between the access point selected from the list and the communication apparatus includes a process for transmitting the input connection information to the communication apparatus.

3. The information processing apparatus according to claim 1,
wherein the process for establishing connection between the access point selected from the list and the communication apparatus includes a process for transmitting connection information on the access point selected from the list to the communication apparatus, and
wherein the process for establishing connection between the access point to which the information processing apparatus is connected and the communication apparatus includes a process for transmitting connection information on the access point to which the information processing apparatus is connected to the communication apparatus.

4. The information processing apparatus according to claim 1, wherein the process for establishing connection between the access point selected from the list and the communication apparatus and the process for establishing connection between the access point to which the information processing apparatus is connected and the communication apparatus are executed via connection between an access point included in the communication apparatus and the information processing apparatus.

5. The information processing apparatus according to claim 4, wherein the connection between an access point included in the communication apparatus and the information processing apparatus is based on any of Wireless Fidelity (Wi-Fi), Bluetooth®, and Near Field Communication.

6. The information processing apparatus according to claim 1, further comprising:
a storage unit configured to store in a memory information on the access point to which the information processing apparatus is connected when the instruction is received;
a switching unit configured to switch, after the information on the access point to which the information processing apparatus is connected when the instruction is received is stored in the memory, a connection destination of the information processing apparatus from the access point to which the information processing apparatus is connected when the instruction is received to an access point included in the communication apparatus; and
an acquisition unit configured to acquire information on the list via connection between the access point included in the communication apparatus and the information processing apparatus.

7. The information processing apparatus according to claim 1, further comprising
a process unit configured to execute a process for establishing connection between an access point included in the communication apparatus and the information processing apparatus, in a case where the information processing apparatus has not connected to any access points.

8. The information processing apparatus according to claim 7, further comprising
a switching unit configured to switch, in a case where, when the instruction is received, the information processing apparatus is not in a state available for connection to an access point, a state of the information processing apparatus to the state available for connection to an access point.

9. The information processing apparatus according to claim 1, further comprising
a switching unit configured to switch a connection destination of the information processing apparatus from the access point to which the information processing apparatus is connected when the instruction is received to a first access point included in the communication apparatus,
wherein, in a case where the information processing apparatus has not connected to any access points, a process for establishing connection between a second access point, which is included in the communication apparatus and is different from the first access point, and the information processing apparatus is executed via connection between the first access point and the information processing apparatus, and
wherein the process for establishing connection between the second access point and the information processing apparatus includes a process for transmitting an instruction for enabling the second access point to the communication apparatus and a process for receiving connection information on the second access point from the information processing apparatus.

10. The information processing apparatus according to claim 1, further comprising
a transmission unit configured to transmit print information to the communication apparatus,
wherein, in a case where the print information is received by the communication apparatus, printing based on the print information is executed by the communication apparatus.

11. A control method for an information processing apparatus that is connectable to an access point and communicates with a communication apparatus via the access point, the method comprising:
receiving from a user an instruction for performing a setting relating to connection of the communication apparatus;
displaying a list of access points connectable by the communication apparatus, in a case where an access point to which the information processing apparatus is connected when the instruction is received is not an access point connectable by the communication apparatus, and not displaying the list, in a case where an access point to which the information processing apparatus is connected when the instruction is received is an access point connectable by the communication apparatus; and executing a process for establishing connection between an access point selected from the list and the communication apparatus, in a case where the access point to which the information processing apparatus is connected when the instruction is received is not an access point connectable by the communication apparatus, and to execute a process for establishing connection between the access point to which the information processing apparatus is connected and the communication apparatus, in a case where the access point to which the information processing apparatus is connected when the instruction is received is an access point connectable by the communication apparatus.

12. The control method according to claim 11, further comprising
receiving an input of connection information on the access point selected from the list,
wherein the process for establishing connection between the access point selected from the list and the communication apparatus includes a process for transmitting the received connection information to the communication apparatus.

13. The control method according to claim 11,
wherein the process for establishing connection between the access point selected from the list and the communication apparatus includes a process for transmitting connection information on the access point selected from the list to the communication apparatus, and
wherein the process for establishing connection between the access point to which the information processing apparatus is connected and the communication apparatus includes a process for transmitting connection information on the access point to which the information processing apparatus is connected to the communication apparatus.

14. The control method according to claim 11, wherein the process for establishing connection between the access point selected from the list and the communication apparatus and the process for establishing connection between the access point to which the information processing apparatus is connected and the communication apparatus are executed via connection between an access point included in the communication apparatus and the information processing apparatus.

15. The control method according to claim 14, wherein the connection between an access point included in the communication apparatus and the information processing apparatus is based on any of Wireless Fidelity (Wi-Fi), Bluetooth®, and Near Field Communication.

16. The control method according to claim 11, further comprising:

storing in a memory information on the access point to which the information processing apparatus is connected when the instruction is received;

switching, after the information on the access point to which the information processing apparatus is connected when the instruction is received is stored in the memory, a connection destination of the information processing apparatus from the access point to which the information processing apparatus is connected when the instruction is received to an access point included in the communication apparatus; and acquiring information on the list via connection between the access point included in the communication apparatus and the information processing apparatus.

17. The control method according to claim 11, further comprising
executing a process for establishing connection between an access point included in the communication apparatus and the information processing apparatus, in a case where the information processing apparatus has not connected to any access points.

18. The control method according to claim 17, further comprising
switching, in a case where, when the instruction is received, the information processing apparatus is not in a state available for connection to an access point, a state of the information processing apparatus to the state available for connection to an access point.

19. The control method according to claim 11, further comprising
switching a connection destination of the information processing apparatus from the access point to which the information processing apparatus is connected when the instruction is received to a first access point included in the communication apparatus,
wherein, in a case where the information processing apparatus has not connected to any access points, a process for establishing connection between a second access point, which is included in the communication apparatus and is different from the first access point, and the information processing apparatus is executed via connection between the first access point and the information processing apparatus, and
wherein the process for establishing connection between the second access point and the information processing apparatus includes a process for transmitting an instruction for enabling the second access point to the communication apparatus and a process for receiving connection information on the second access point from the information processing apparatus.

20. The control method according to claim 11, further comprising
transmitting print information to the communication apparatus,
wherein, in a case where the print information is received by the communication apparatus, printing based on the print information is executed by the communication apparatus.

* * * * *